(No Model.)
F. BUCHHOP & H. SCHNACKENBERG.
LENS GRINDER.
No. 551,717. Patented Dec. 17, 1895.
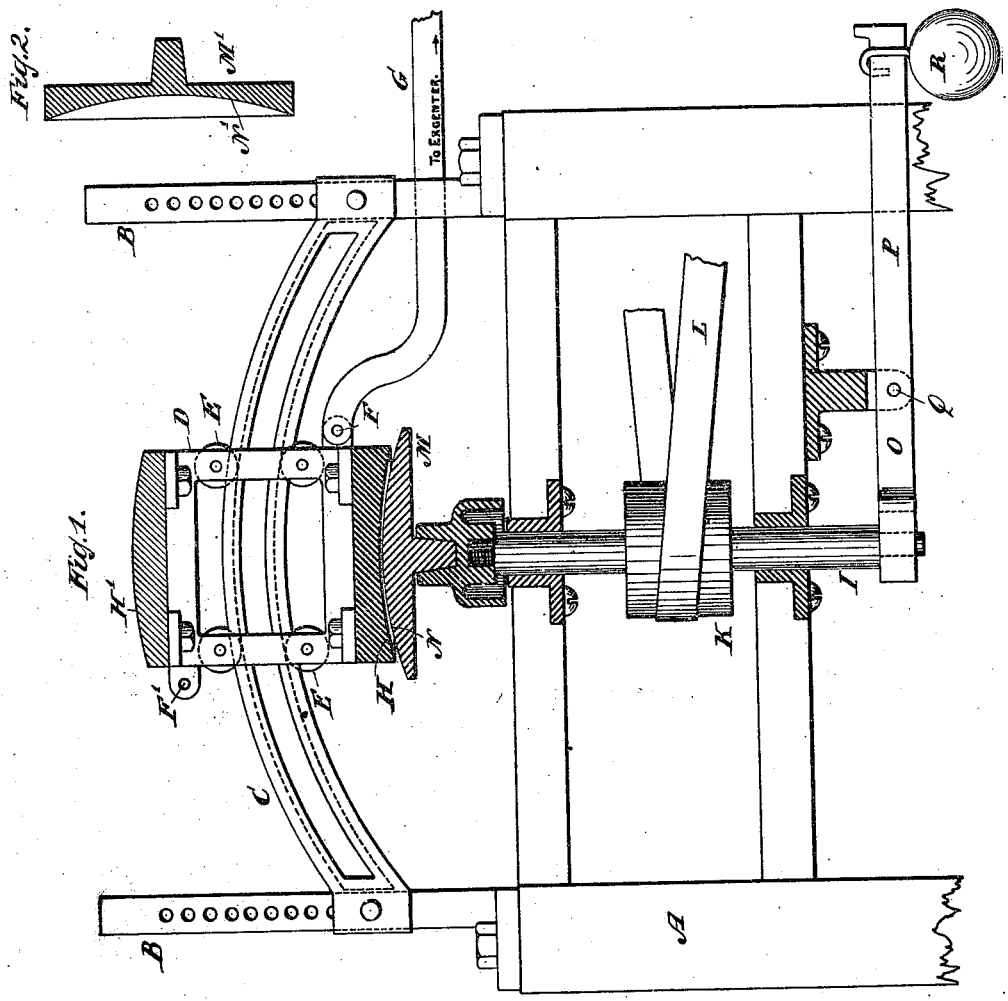
WITNESSES:
INVENTORS:
Ferdinand Buchhop.
Hugo Schnackenberg.
BY
Hauff + Hauff
their ATTORNEYS.

UNITED STATES PATENT OFFICE.

FERDINAND BUCHHOP AND HUGO SCHNACKENBERG, OF NEW YORK, N. Y., ASSIGNORS TO THE MEYROWITZ MANUFACTURING COMPANY, OF RIDGEFIELD, NEW JERSEY.

LENS-GRINDER.

SPECIFICATION forming part of Letters Patent No. 551,717, dated December 17, 1895.

Application filed May 28, 1894. Serial No. 512,748. (No model.)

*To all whom it may concern:*

Be it known that we, FERDINAND BUCHHOP and HUGO SCHNACKENBERG, citizens of the United States of America, and residents of New York, in the State of New York, have invented a new and useful Improvement in Lens-Grinders, of which the following is a specification.

The primary object of this invention is to produce at a single operation ellipsoidal astigmatic lenses for spectacles and eyeglasses, or, in other words, those lenses which combine on one surface a cylindrical and a spherical effect.

To this end the invention consists in the combination of a rotary grinding-tool, a reciprocating lens-carrier and a curved guide for the latter eccentric to the surface of said grinding-tool, whereby two distinct curvatures are simultaneously produced upon the exposed surface of the lens, the radius of one being determined by that of the grinding-tool, while the other is a given curvature in one meridian of the lens independent of the curvature of the grinding-tool.

The invention further consists in the specific lens-grinder hereinafter described, which comprises interchangeable grinding-tools and a reversible lens-carrier, so that a second grinding-tool only is required to produce concave and convex lenses of like radii.

A sheet of drawings accompanies this specification as part thereof.

Figure 1 of the drawings is a front elevation, partly in section, of the specific lens-grinder above referred to, and Fig. 2 is a diametric section of an alternative grinding-tool for the same.

In the construction of said specific lens-grinder a suitable frame or support A is provided with a pair of standards B, which carry between them a curved guide C, upon which a reciprocating lens-carrier D is mounted, being preferably provided with antifriction-wheels E to coact with the guide. Said guide C is vertically adjustable upon the standards B, and is also removable therefrom and reversible, together with the lens-carrier D, so that both may be used in grinding convex as well as concave curves. The lens-carrier is accordingly provided with a pair of couplings F F' for use in its respective positions to coact with a pitman or connecting-bar G, worked, for example, by a crank or eccentric. The lens-carrier has also a pair of faces or seats H H', to the lowermost of which the lens-blanks are attached in customary manner.

Beneath the lens-carrier a vertical shaft I is mounted in suitable bearings, and rotated by suitable means, as a pulley K and a belt L, its upper end carrying the holder of interchangeable grinding-tools M and M', constructed respectively with convex and concave grinding-faces N N', which match or oppose respectively the concave lens-holding face H and the convex lens-holding face H' of the lens-carrier. The grinding-tool is pressed against the lens-blanks by a lever O P, fulcrumed at Q and suitably weighted, as at R.

The curve of the guide C is that desired in one meridian of given lenses for the correction of astigmatism, while the desired concavity or convexity of the lens determines the curvature of the grinding-surface N or N'.

Suppose the parts to be in the position shown in Fig. 1, and a lens-blank, or a number of lens-blanks, to be cemented to the lens-carrier face H, and the lens-carrier reciprocated on the guide C by the actuator G, while the grinding-tool M is being rotated through the medium of the driving-belt L, pulley K and shaft I. As, now, the lens-blanks are carried back and forth in contact with the convex face N of said tool M, the necessary grinding media being interposed between said face and the lens-blanks, the grinding-tool is made to produce a curvature on the lens in one meridian concentric with said guide C, while, as the lens-blanks have no motion transverse to said guide, the curvature of the grinding-face N is reproduced in such transverse direction. In other words, two distinct curvatures are simultaneously ground by one and the same grinding-tool, and concave ellipsoidal astigmatic lenses are thus produced.

With the guide C and lens-carrier D reversed and the grinding-tool M' substituted for the grinding-tool M, convex ellipsoidal astigmatic lenses will be produced in like manner.

We do not limit ourselves to a machine provided with a reversible guide and a reversible lens-carrier as well as interchangeable tools, nor to the particular mechanical details and proportions represented by the drawings.

Having thus described the said improvement, we claim as our invention and desire to patent under this specification—

1. A lens-grinder comprising a rotary grinding-tool having a grinding-face of a given curvature, a curved guide eccentric to said grinding-face, and a lens-carrier reciprocating upon said curved guide, for producing ellipsoidal astigmatic lenses in the manner hereinbefore set forth.

2. The combination, in a lens-grinder, of a rotary shaft provided with a holder for interchangeable grinding-tools having grinding-faces which are respectively convex and concave, a detachable grinding tool carried by said holder a reversible curved guide eccentric to said faces respectively in its alternative positions, a reversible lens-carrier mounted upon said guide and provided with convex and concave lens-holding faces, means for rotating the grinding tool, and means for reciprocating said lens-carrier lengthwise of said guide, substantially as hereinbefore specified.

In testimony whereof we have hereunto set our hands in the presence of two subscribing witnesses.

FERDINAND BUCHHOP.
HUGO SCHNACKENBERG.

Witnesses:
WM. C. HAUFF,
E. F. KASTENHUBER.